F. JUTRASH.
TRAP.
APPLICATION FILED SEPT. 29, 1908.

920,748.

Patented May 4, 1909.
2 SHEETS—SHEET 1.

WITNESSES:
Thos. W. Riley
J. R. French

INVENTOR
F. Jutrash
BY
W. J. Fitzgerald
Attorneys

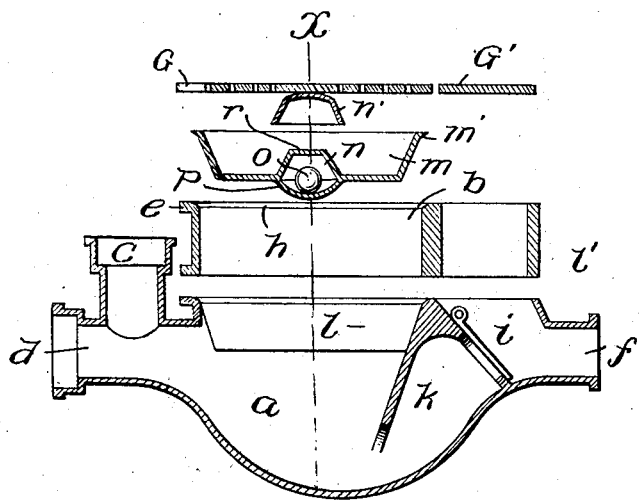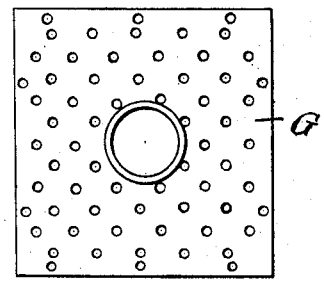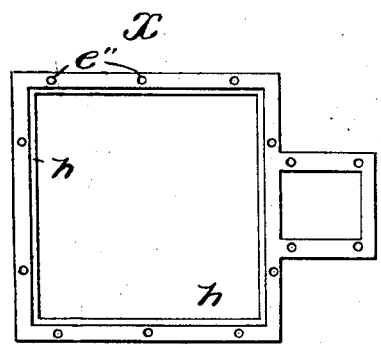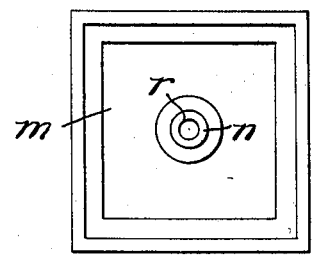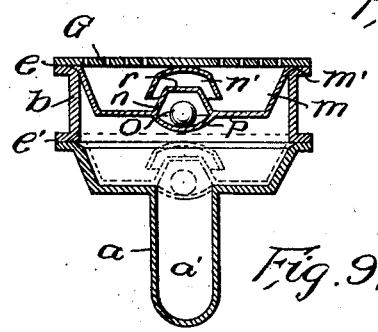

UNITED STATES PATENT OFFICE.

FRANK JUTRASH, OF LAURIUM, MICHIGAN.

TRAP.

No. 920,748.　　　Specification of Letters Patent.　　　Patented May 4, 1909.

Application filed September 29, 1908. Serial No. 455,272.

*To all whom it may concern:*

Be it known that I, FRANK JUTRASH, a citizen of the United States, residing at Laurium, in the county of Houghton and State of Michigan, have invented certain new and useful Improvements in Traps; and I do hereby declare the following to be a full, clear, and exact description of the invention, such as will enable others skilled in the art to which it appertains to make and use the same.

My invention relates to new and useful improvements in traps and more particularly to that class adapted to be used in connection with sewers and other drainage points and my object is to provide a device of this class, whereby the usual form of bell trap may be dispensed with.

A further object is to provide a device of this class which may be placed in a cellar and attachments applied thereto for draining water or the like from the floor of the cellar.

A still further object is to provide means for closing the drainage opening into the cellar when the trap is being flushed from a different source.

A still further object is to provide a suitable seal for the trap to prevent sewage gases from returning therethrough.
A still further object is to provide a suitable valve for closing that end of the trap connected with the sewer and a still further object is to provide means for gaining access to the trap, whereby the same may be cleaned.

Other objects and advantages will be hereinafter referred to and more particularly pointed out in the claims.

Figure 1:
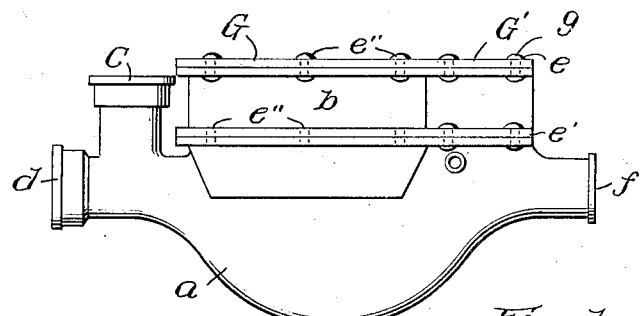
Figure 2:
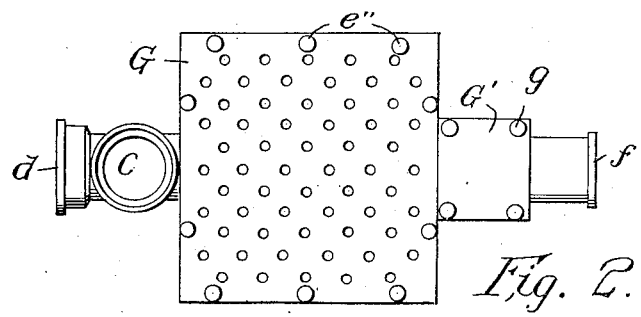
Figure 3:
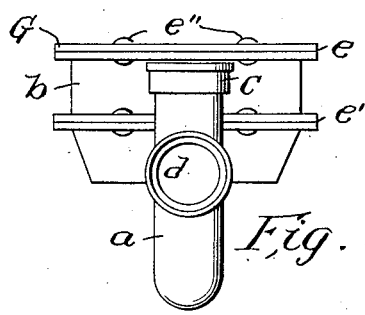
Figure 4:
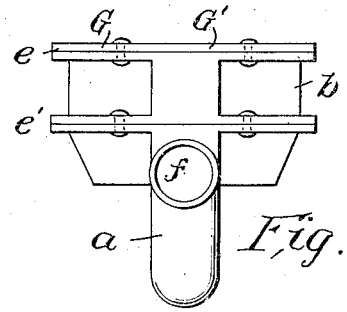

In the accompanying drawings which are made a part of this application, Figure 1 is a side elevation of my improved trap in its assembled position. Fig. 2 is a top plan view thereof. Fig. 3 is an end elevation of the trap. Fig. 4 is a similar view of the opposite end of the trap. Fig. 5 is a longitudinal central sectional view through the trap, showing the various parts thereof in position to be assembled. Fig. 6 is a plan view of an extension for the trap. Fig. 7 is a bottom plan view of a perforated cover plate for that portion of the trap employed for draining cellars or other subways. Fig. 8 is a top plan view of the sink employed in connection with the trap for drainage purposes in the cellar, and, Fig. 9 is a transverse sectional view through the trap in its assembled position, as seen on line $x$—$x$, Fig. 5.

$a$ indicates the body of my improved trap, which is preferably oblong and terminates at its opposite ends in connections $d$ and $f$, the connection $d$ being adapted to be attached to closets, sinks, etc., placed at suitable points in a building and the connection $f$ is adapted to be connected to a sewer or other suitable drainage at a point between the connections $d$ and $f$.

The body $a$ is extended downwardly to form a sealing chamber $a'$, a wall $k$ being extended downwardly from the upper edge of the body to a point adjacent the lower portion of the chamber $a'$, below which the substance entering the trap from the connection $d$ must pass on its way to the sewer, and as the lower edge of the wall $k$ is below the level of the lowermost portions of the connections $d$ and $f$, a perfect seal will be formed in the trap and sewer gases prevented from returning through the trap.

At a suitable point between the wall $k$ and the connection $f$ is located a clack valve $i$, which is hingedly secured in position and will prevent any return flow of the sewage into the trap after the same has once passed beyond the valve.
When the trap is used in connection with a building, it is preferably located in the cellar, where a cellar is provided and in order to utilize the trap for draining the cellar, that portion of the upper edge of the trap between the wall $k$ and an air vent C is left open and provided with a tapered seat $l$, in which is adapted to extend a sink $m$ and over the sink is disposed a perforated cover G and by placing the cover G flush with or slightly below the cellar floor, any water or other fluid that may be deposited on the cellar floor, will readily pass through the cover and into the trap.

The central portion of the sink $m$ is provided with a dome-like extension $n$, through the apex of which is formed an opening $r$ and by extending the projection $n$ a distance above the floor of the sink, dirt or other foreign particles will be prevented from readily passing into the trap and to more readily protect the opening $r$, a bell $n'$ is fixed to the cover G and extends over the extension $n$ and is of such size as to provide a passage entirely around the extension and over the upper end thereof.

To prevent the sewage entered into the trap through the connection $d$ from passing through the opening $r$ and entering the cellar, I provide a ball valve $o$, which is adapted to be located in the extension $n$ and is held in position to readily raise and close the opening $r$ by means of a wire or other form of frame $p$.

That portion of the body between the connection $f$ and wall $k$ is also provided with an opening $i'$, whereby access may be had to the interior of that portion of the body surrounding the valve $i$, so that the trap at this point may be readily cleaned, a cover $G'$ being provided at this point, which is held in position over the opening $i'$ by means of bolts $g$.

Instead of placing the sink directly in engagement with the seat $l$, an extension $b$ may be provided and secured to flanges $e'$, surrounding the seat $l$, said extension being provided with a seat $h$, at its upper edge to receive the sink $m$, the extension $b$ being secured to the flange $e'$ by means of bolts $e''$, while the cover $G$ is secured to a flange $e$ at the upper edge of the extension.

By providing the extension, the trap will be extended a greater distance into the ground and may be placed on the outside of the building, as the depth to which the trap extends below the surface of the ground, will prevent freezing of the trap.

In all of the views showing the completed device, the extension $b$ is shown attached to the trap, but in Fig. 9 I have shown by dotted lines the position of the sink and parts coöperating therewith when the extension is not in use.

It will thus be seen that I have provided a very cheap and economical form of trap and one that can be used without employing the usual or well-known form of bell trap and it will further be seen that my improved trap may be installed in practice at any point within a building or on the exterior thereof and it will likewise be seen that in view of the few elements employed in constructing the trap, said trap will be very efficient in operation and may be readily dissembled for cleaning purposes.

What I claim is:

1. A device of the character described comprising a body having opposed end connections and a depressed chamber arranged intermediate of said connections, a wall having its upper end arranged at the upper edge of said body and its lower end arranged near the bottom of said depressed chamber, a valve arranged intermediate of said wall and one of said connections, and an extension applied to the upper edge of said body and a sink arranged in said extension and provided with a valve.

2. A device of the character described comprising a body having opposed end connections and a depressed chamber arranged intermediate of said connections, a wall having its upper end arranged at the upper edge of said body and its lower end near the bottom of said depressed chamber, a valve arranged intermediate of said wall and one of said connections, an extension applied to the upper edge of said body and provided with a compartment opening into one of said connections and a sink seated in said extension and having a valve seated centrally therein, said sink having a housing or hood arranged above said valve.

In testimony whereof I have signed my name to this specification in the presence of two subscribing witnesses.

FRANK JUTRASH.

Witnesses:
 JOHN STETTER,
 J. C. LIGHT.